(12) United States Patent
Kim et al.

(10) Patent No.: US 10,470,134 B2
(45) Date of Patent: Nov. 5, 2019

(54) METHOD OF CONTROLLING AN ELECTRONIC DEVICE ACCORDING TO A COMMUNICATION STATE OF THE ELECTRONIC DEVICE

(71) Applicant: Samsung Electronics Co., Ltd., Gyeonggi-do (KR)

(72) Inventors: Hee Tae Kim, Gyeonggi-do (KR); Se Young Jang, Gyeonggi-do (KR); Bong Su Chun, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 30 days.

(21) Appl. No.: 14/825,623

(22) Filed: Aug. 13, 2015

(65) Prior Publication Data

US 2016/0050712 A1  Feb. 18, 2016

(30) Foreign Application Priority Data

Aug. 13, 2014  (KR) .................. 10-2014-0105499

(51) Int. Cl.
*G08C 17/00* (2006.01)
*H04W 52/02* (2009.01)
(Continued)

(52) U.S. Cl.
CPC ........ *H04W 52/0287* (2013.01); *G06F 1/324* (2013.01); *G06F 1/3278* (2013.01); *G06F 1/3287* (2013.01); *G06F 1/3296* (2013.01); *H04W 52/028* (2013.01); *H04W 76/28* (2018.02); *Y02D 10/126* (2018.01); *Y02D 10/157* (2018.01); *Y02D 10/171* (2018.01); *Y02D 10/172* (2018.01); *Y02D 70/1242* (2018.01); *Y02D 70/1262* (2018.01);
(Continued)

(58) Field of Classification Search
CPC ............ H04W 76/048; H04W 52/028; H04W 52/287; G06F 1/324; G06F 1/3278; G06F 1/3287; G06F 1/3296
USPC .......... 370/216–228, 311; 455/132–140, 101
See application file for complete search history.

(56) References Cited

U.S. PATENT DOCUMENTS 5,838,720 A * 11/1998 Morelli ................ H04B 1/1615
340/10.33
6,160,990 A * 12/2000 Kobayashi ............. H04N 7/102
348/E7.052

(Continued)

FOREIGN PATENT DOCUMENTS

EP  2 566 100  3/2013

OTHER PUBLICATIONS

European Search Report dated Nov. 16, 2015 issued in counterpart application No. 15180868.0-1959, 10 pages.

(Continued)

*Primary Examiner* — Thai D Hoang
(74) *Attorney, Agent, or Firm* — The Farrell Law Firm, P.C.

(57) ABSTRACT

An electronic device and a method of controlling the electronic device are provided. A memory and a processor are electrically connected with the memory. The processor controls at least one of a change in a specified operation power, a change in a specified operation clock rate, and an operation state of a diversity module of the electronic device when the electronic device enters an inactive period after an active period associated with transmitting data has ended.

18 Claims, 9 Drawing Sheets

(51) Int. Cl.
    *G06F 1/324*     (2019.01)
    *G06F 1/3234*     (2019.01)
    *G06F 1/3287*     (2019.01)
    *G06F 1/3296*     (2019.01)
    *H04W 76/28*     (2018.01)

(52) U.S. Cl.
    CPC ........ *Y02D 70/1264* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/26* (2018.01)

(56) References Cited

U.S. PATENT DOCUMENTS

| | | | |
|---|---|---|---|
| 6,965,588 B2 | 11/2005 | Schmidt et al. | |
| 7,710,987 B2 | 5/2010 | Jayapalan et al. | |
| 8,116,404 B2* | 2/2012 | Arambepola | H04B 7/0857 375/267 |
| 8,175,534 B2 | 5/2012 | Harper et al. | |
| 8,964,611 B2 | 2/2015 | Das et al. | |
| 2003/0099214 A1 | 5/2003 | Schmidt et al. | |
| 2004/0242277 A1* | 12/2004 | Kiribayashi | H04B 7/0808 455/562.1 |
| 2006/0050668 A1 | 3/2006 | Harper et al. | |
| 2006/0094379 A1* | 5/2006 | Gamo | H04B 7/0871 455/137 |
| 2007/0140143 A1 | 6/2007 | Harris | |
| 2008/0144574 A1 | 6/2008 | Jayapalan et al. | |
| 2009/0061799 A1* | 3/2009 | Park | H04W 52/0258 455/127.5 |
| 2009/0077394 A1* | 3/2009 | Tsai | G06F 1/3209 713/310 |
| 2009/0077395 A1 | 3/2009 | Tsai | |
| 2009/0077396 A1 | 3/2009 | Tsai et al. | |
| 2009/0077401 A1 | 3/2009 | Tsai | |
| 2009/0275337 A1* | 11/2009 | Maeda | H04W 36/18 455/442 |
| 2011/0111700 A1* | 5/2011 | Hackett | A01G 25/16 455/41.2 |
| 2012/0083223 A1 | 4/2012 | Li et al. | |
| 2012/0120858 A1 | 5/2012 | Das et al. | |
| 2012/0178491 A1 | 7/2012 | Tsai | |
| 2012/0213067 A1 | 8/2012 | Harper et al. | |
| 2013/0054996 A1 | 2/2013 | Diab et al. | |
| 2013/0163492 A1 | 6/2013 | Wong | |
| 2014/0256386 A1* | 9/2014 | Song | H04W 52/0241 455/574 |
| 2016/0050712 A1* | 2/2016 | Kim | H04W 52/028 370/311 |
| 2016/0150392 A1* | 5/2016 | Jung | H04W 8/005 455/450 |

OTHER PUBLICATIONS

European Summons to Attend Oral Proceedings dated Mar. 27, 2018 issued in counterpart application No. 15180868.0-1221, 9 pages.

\* cited by examiner

METHOD OF CONTROLLING AN ELECTRONIC DEVICE ACCORDING TO A COMMUNICATION STATE OF THE ELECTRONIC DEVICE

PRIORITY

This application claims priority under 35 U.S.C. § 119(a) to Korean Patent Application Serial Number 10-2014-0105499, which was filed in the Korean Intellectual Property Office on Aug. 13, 2014, the entire disclosure of which is incorporated herein by reference.

BACKGROUND OF THE DISCLOSURE

1. Field of the Disclosure

The present disclosure relates generally to controlling an electronic device, and more particularly, to a method of controlling an electronic device according to a communication state of the electronic device.

2. Description of the Related Art

Electronic devices, such as conventional smartphones, support various user functions. For example, electronic devices support a function of connecting to a base station device and transmitting and receiving data with a server device connected with the base station device.

In connection with processing the above-mentioned operation, electronic devices maintain a channel during a specific time after transmitting and receiving data in response to a request of the server device or a set protocol. Electronic devices consume a certain amount of power to maintain the channel in this process. When the electronic devices are in a state where data is not transmitted and received, the electronic devices consume unnecessary power to maintain the channel.

SUMMARY OF THE DISCLOSURE

The present disclosure has been made to address at least the above-mentioned problems and/or disadvantages and to provide at least the advantages described below. Accordingly, an aspect of the present disclosure is to provide a method of controlling an electronic device according to a communication state of the electronic device to reduce current consumption, and an electronic device for supporting the same.

In accordance with an aspect of the present disclosure, there is provided an electronic device. The electronic device includes a memory and a processor that is electrically connected with the memory. The processor controls at least one of a change in a specified operation power, a change in a specified operation clock rate, and an operation state of a diversity module of the electronic device when the electronic device enters an inactive period after an active period associated with transmitting data has ended.

In accordance with another aspect of the present disclosure, there is provided a method of controlling an electronic device according to a communication state. The method includes determining whether the electronic device enters an inactive period after an active period associated with transmitting data has ended and when the electronic device enters the inactive period, controlling at least one of a change in a specified operation power of a processor, a change in a specified operation clock rate of the processor, and an operation state of a diversity module of the electronic device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
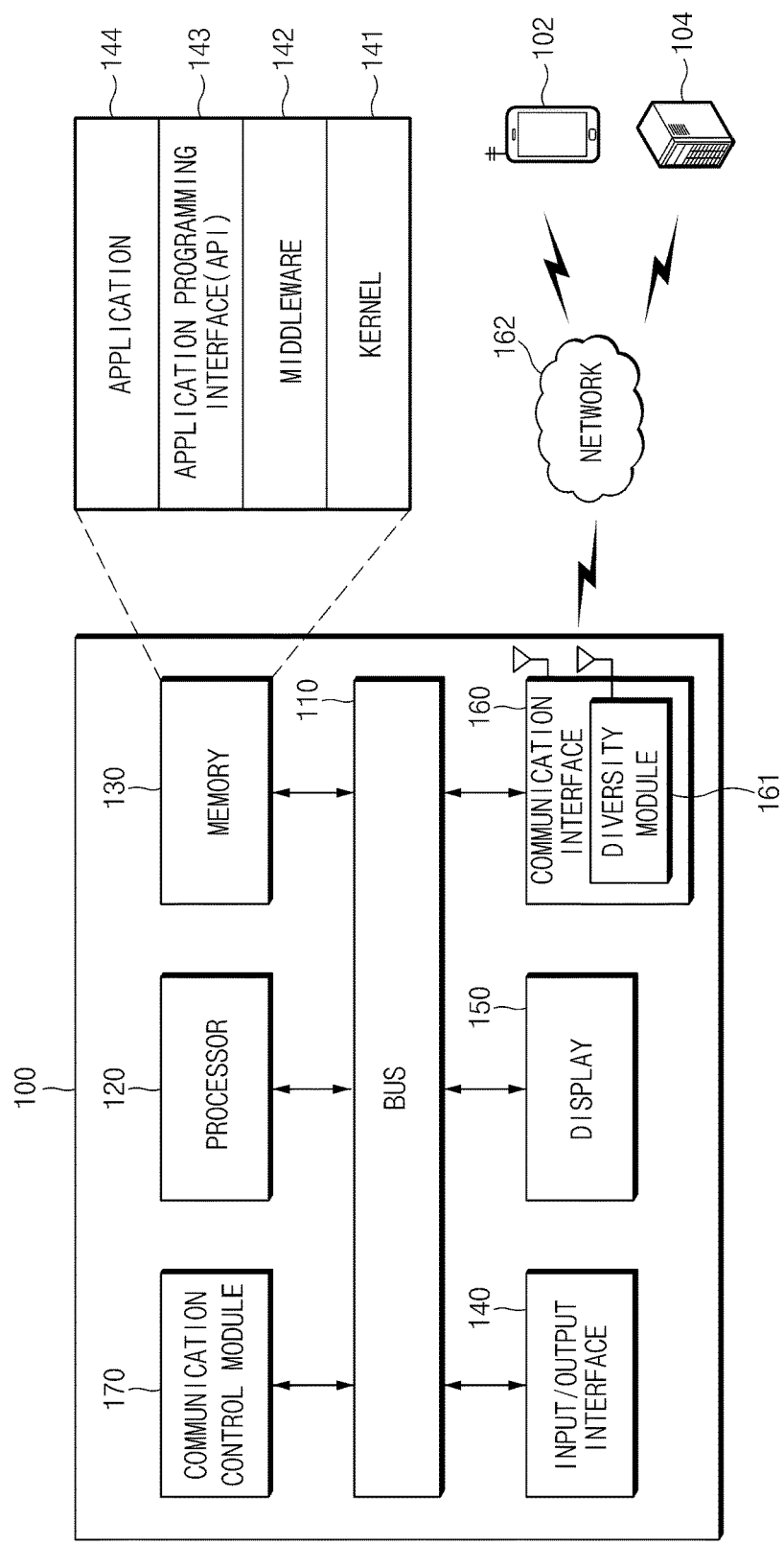
FIG. 1 is a diagram illustrating a configuration of an electronic device in a network environment, according to an embodiment of the present disclosure.

Hereinafter, the present disclosure is described with reference to the accompanying drawings. However, the present disclosure is not intended to be limited to the specific embodiments, and it is understood that it should include various modifications, equivalents, and/or alternatives according to various embodiments of the present disclosure. With respect to the descriptions of the drawings, like reference numerals refer to like elements.

As disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

As disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

Expressions such as "1st", "2nd", "first", or "second", and the like used in various embodiments of the present disclosure may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

The expression "configured to," as used herein, is synonymous to the expression "suitable for", "having the capacity to", "designed to", "adapted to", "made to", or "capable of". The term "configured to" is not synonymous to "specifically designed to". Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

The term "module" used herein may be defined as, for example, a unit including one of hardware, software, and firmware or two or more combinations thereof. The term "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal manner unless expressly so defined herein. In some cases, even if terms are terms which are defined in the specification, they may not be interpreted to exclude embodiments of the present disclosure.

In accordance with embodiments of the present disclosure, electronic devices may include, but are not limited to, at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices (e.g., smart glasses, head-mounted-devices (HMDs), an electronic apparel, electronic bracelets, electronic necklaces, electronic appcessories, electronic tattoos, smart mirrors, or smart watches).

The electronic devices may be smart home appliances. The smart home appliances may include, but is not limited to, at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync®, Apple TV®, or Google TV®), game consoles (e.g., Xbox® and PlayStation®), electronic dictionaries, electronic keys, camcorders, or electronic picture frames.

The electronic devices may include, but are not limited to, at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or Internet of Things (e.g., light bulbs, various sensors, electric or gas meters, sprinkler devices, fire alarms, thermostats, street lamps, toasters, exercise equipment, hot water tanks, heaters, boilers, and the like).

The electronic devices may include, but are not limited to, at least one of parts of furniture or buildings/structures, electronic boards, electronic signature receiving devices, projectors, or various measuring instruments (e.g., water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to technology development Hereinafter, electronic devices according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 is a diagram illustrating an electronic device 100 operation environment associated with processing a profile corresponding to a network state, according to an embodiment of the present disclosure.

Referring to FIG. 1, the electronic device 100 includes a bus 110, a processor 120, a memory 130, an input and output interface 140, a display 150, a communication interface 160, and a communication control module 170. At least one of the above elements may be omitted from the electronic device 100 or other elements may be added in the electronic device 100.

The electronic device 100 adjusts a device element associated with a specific communication state or environment, thereby reducing power required for the specific communication state or environment. For example, the electronic device 100 adjusts at least one of an operation power and an operation clock of the processor 120 or a modem or an antenna state during an inactive period (or a control signal transmission and reception period) of a communication channel. The electronic device 100 minimizes power consumption required for the inactive period of the communication channel and/or operates based on a specific power value. Also, the electronic device 100 minimizes power consumption by adaptively selecting an element of the electronic device, which is adjusted in response to a state of the communication channel (e.g., a communication environment including at least one of strength or intensity of a transmission and reception signal, a data rate, a data transfer rate, a data transfer error rate, or a bandwidth), and by optimizing maintenance of a communication service.

The electronic device 100 communicates with other electronic communication devices over a network 162, which may include a telecommunications network, for example, at least one of a computer network (e.g., a local area network (LAN) or a wide area network (WAN)), the Internet, or a telephone network. The network 162 establishes a communication channel associated with operating a communication service of the electronic device 100. When the communication service is operated, there may be an active period, an inactive period, and an idle period corresponding to a data transfer (transmission or reception) state and the like.

The other electronic communication devices may include an electronic device 102, which may be the same device as the electronic device 100 or a device which is different from the electronic device 100. The electronic device 102 may transmit a call connection request message to the electronic device 100 through the network 162 or may establish a communication channel to request transmission of a message.

A server 104 may include a group of one or more servers. All or some of operations executed in the electronic device 100 may be executed in the electronic device 102 or a plurality of electronic devices (e.g., the electronic device 102 or the server 104). The server 104 establishes a communication channel with the electronic device 100 and/or the electronic device 102 in connection with supporting a data service.

When the electronic device 100 is required to perform a certain function or service automatically or according to a request, instead of the electronic device 100 executing the function or the service, it may request another electronic device 102 or the server 104 to perform at least a part of the function or the service. The other electronic device 102 or the server 104 performs the requested function or service or the added function or service and transmits the performed result to the electronic device 100. The electronic device 100 processes the received result without change and provides the requested function or service to one or more computing technologies. For this, for example, cloud computing technology, distributed computing technology, or client-server computing technology may be used.

In connection with the above-mentioned function of controlling the communication state, the bus 110 of the electronic device 100 may include, for example, a circuit which connects the components 110-170 with each other and transmits communication (e.g., a control message and/or data) between the components. For example, the bus 110 may transmit data received through the communication interface 160 to the processor 120 or the communication control module 170. The bus 110 may transmit a control signal of the processor 120 or the communication control module 170 to a diversity module 161 included in the communication interface 160. Alternatively, the bus 110 may transmit a control signal of the communication control module 170 to the processor 120.

The processor 120 includes at least one of an application processor (AP), a communication processor (CP), or a central processing unit (CPU). The processor 120 may perform, for example, calculation or data processing about control and/or communication of at least one of other components of the electronic device 100. The processor 120 may be driven by a specified operation power (i.e., an amount of power required to perform a specified operation) in response to a control signal transmitted from the communication control module 170 or a communication state of the communication interface 160. For example, operation powers of the processor 120, which are used in an active period, an inactive period, and an idle period in a communication service state, may be differently set. In this regard, the processor 120 may control a supply device (e.g., a power management integrated circuit (PMIC)) which supplies an operation power. For example, when the communication service state is in the inactive period, the processor 120 may control the supply device to supply a specified operation power (e.g., a specific voltage or a specific clock).

The processor 120 may be used in conjunction with a device including the communication control module 170. Control of operation powers according to the above-mentioned communication service states or control of antenna states may be performed by at least one of the AP or the CP. For example, the AP of the processor 120 may be responsible for processing an active period and an inactive period. Alternatively, the CP of the processor 120 may be responsible for processing an idle period (or the inactive period and the idle period). A time point (i.e., a specific time) of controlling an operation power of the processor 120 may differ corresponding to a communication environment or control of the diversity module 161.

The memory 130 may include a volatile and/or non-volatile memory. The memory 130 stores, for example, instructions or data associated with at least one of other components of the electronic device 100. The memory 130 stores software and/or programs. The programs may include, for example, a kernel 141, a middleware 142, an application programming interface (API) 143, and/or an application program (or application) 144. At least a part of the kernel 141, the middleware 142, or the API 143 may be referred to as an operating system (OS).

The kernel 141 controls or manages system resources (e.g., the bus 110, the processor 120, the memory 130, or the communication control module 170, and the like) used to execute an operation or function implemented in the other programs (e.g., the middleware 142, the API 143, or the application program 144). Also, the kernel 141 provides an interface which may control or manage system resources by accessing a separate component of the electronic device 100 in the middleware 142, the API 143, or the application program 144. The kernel 141 manages an operation of the API 143 for controlling an operation power or an antenna module (e.g., the diversity module 161) of the electronic device 100 in response to a communication state.

The middleware 142 operates as, for example, a go-between such that the API 143 or the application program 144 communicates with the kernel 131 and transmits and receives data. Also, the middleware 142 controls (e.g., scheduling or load balancing) work requests using a method of assigning priority which may use system resources (the bus 110, the processor 120, the memory 130, or the communication control module 170, and the like) of the electronic device 100, for example, at least one of the application program 144, in connection with the work requests received from the application program 144. The middleware 142 transmits information regarding a change in a communication state, for example, a change in each of an active period, an inactive period, and an idle period to the kernel 141, and provides support to communicate with the API 143 associated with processing each of active period, the inactive period, and the idle period.

The API 143 may be, for example, an interface in which the application program 144 controls a function provided from the kernel 141 or the middleware 142. For example, the API 143 includes at least one interface or function (e.g., instruction) for file control, window control, image processing, or text control, and the like. The API 143 includes an API associated with verifying a communication state and an API associated with controlling an operation power or an antenna module corresponding to a communication state. Additionally or alternatively, the API 143 includes an API for checking a communication environment and an API for performing at least one of operation power control or antenna module control corresponding to the checked result.

The input and output interface 140 operates as, for example, an interface which may transmit instructions or data input from a user or another external device to another component (or other components) of the electronic device 100. Also, input and output interface 140 outputs instructions or data received from another component (or other components) of the electronic device 100 to the user or the other external device. The input and output interface 140 generates an input signal, which is associated with setting the electronic device 100 corresponding to a communication state, in response to control of the user. For example, the input and output interface 140 generates an input signal associated with selecting a power reduction mode (or function) or a speed enhancement mode (or function) and an input signal associated with selecting a detailed mode corresponding to the selected mode according to input of the user.

The display 150 may include, for example, a liquid crystal display (LCD), a light emitting diode (LED) display, an organic LED (OLED) display, a microelectromechanical systems (MEMS) display, or an electronic paper display. The display 150 displays, for example, various contents (e.g., texts, images, videos, icons, or symbols, and the like) to the user. The display 150 may include a touch screen, and may receive, for example, touch, gesture, proximity, or hovering input using an electronic pen or a part of a body of the user.

The display 150 outputs various screens corresponding to communication states. For example, the display 150 outputs a screen (e.g., a data receiving state screen, a data transmitting state screen, and the like) associated with transmitting and receiving data in an active period and a screen (e.g., a data receiving completion screen) corresponding to an end of the active period. Also, the display 150 outputs a screen (e.g., a screen for outputting received data, and the like) associated with an inactive period and a screen (e.g., a screen-off state corresponding to a sleep state) associated with an idle period.

The display 150 outputs a communication setting screen. For example, the display 150 outputs a setting screen for changing an operation power of a specific component (e.g., a CP (modem), an AP, a radio frequency (RF) related module (e.g., the diversity module 161)) to a specific power or a minimum power. Alternatively, the display 150 outputs a turn-on state or a turn-off state of the RF related module.

The communication interface 160 establishes communication between, for example, the electronic device 100 and the external electronic device 102 or the server 104. For example, the communication interface 160 connects to the network 162 through wireless communication (or local-area wireless communication) or wired communication and communicates with the external electronic device 102 or the server 104. The wireless communication may include, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. The wired communication may include at least one of, for example, a universal serial bus (USB), a high definition multimedia interface (HDMI), a recommended standard 232 (RS-232), or a plain old telephone service (POTS), and the like. The local-area wireless communication may include a communication method established according to a Bluetooth® (BT) communication module, a wireless-fidelity (Wi-Fi) direct communication module, and the like.

The communication interface 160 operates a plurality of antennas according to communication supporting methods. In this regard, the communication interface 160 includes the diversity module 161, which controls operation of a plurality of antennas according to support of a specific communication method. The diversity module 161 may be supplied a certain power from a power supply device of the electronic device 100. The diversity module 161 may be controlled corresponding to a communication state of the electronic device 100. For example, when the communication state is in an inactive period, the diversity module 161 may be in a turn-off state. In the turn-off state, the diversity module 161 provides support such that a specific antenna connects with a communication chip. The diversity module 161 may be in the turn-off state in an idle period. The diversity module 161 may be in a turn-on state and the turn-off state in the inactive period corresponding to certain periods. For example, the diversity module 161 may be in the turn-on state during a period immediately after transmitting a control signal to the server 104 and during the inactive period or during a period for receiving a certain control signal from the server 104, and may be in the turn-off state during the rest period. A turn-off time point of the diversity module 161 may differ in response to a communication environment in an active period. For example, when the communication environment in the active period is good (e.g., when each of state values of specific communication environment elements is greater than or equal to a specific or predetermined value), the turn-off time point of the diversity module 161 may be identical to a time point when the electronic device 100 enters the inactive period. Alternatively, when the communication environment in the active period is bad (e.g., when each of the state values of the specific communication environment elements is less than the specific or predetermined value), the turn-off time point of the diversity module 161 may be a time point when a specific time elapses after the electronic device 100 enters the inactive period.

The communication control module 170 controls at least one of an operation power or an antenna module of the electronic device 100 corresponding to a communication state of the electronic device 100. As described above, the communication control module 170 may be included in the processor 120 or be independent of the processor 120. FIG. 1 illustrates an example in which the communication control module 170 communicates with the processor 120 through the bus 110. However, the communication control module 170 may control the processor 120 corresponding to a communication line through which it directly communicates with the processor 120.

Figure 2:
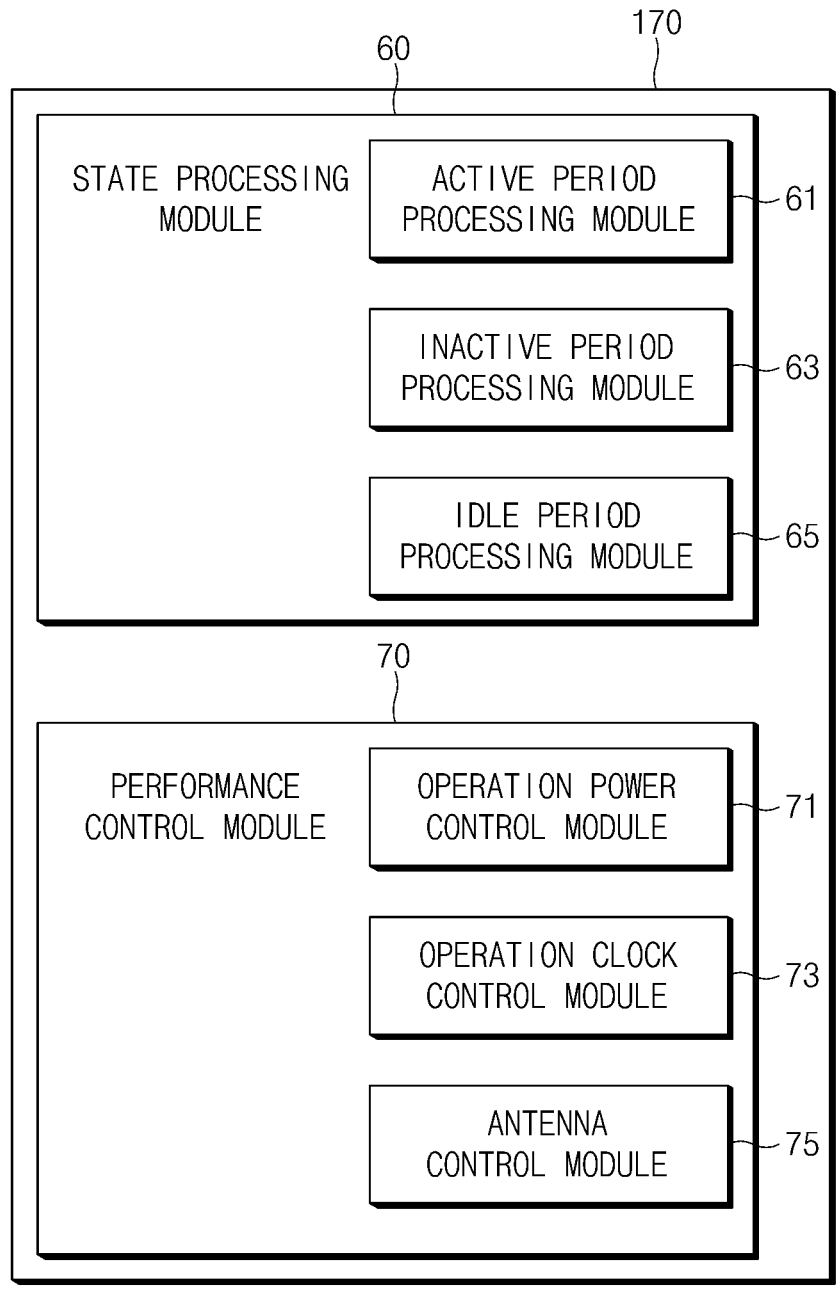
FIG. 2 is a diagram illustrating a configuration of a communication control module, according to an embodiment of the present disclosure.

FIG. 2 is a diagram illustrating a configuration of the communication control module 170, according to an embodiment of the present disclosure.

Referring to FIG. 2, the communication control module 170 includes a state processing module 60 and a performance control module 70. The state processing module 60 includes an active period processing module 61, an inactive period processing module 63, and an idle period processing module 65. The performance control module 70 includes an operation power control module 71, an operation clock control module 73, and an antenna control module 75.

An active period may be a period when data is transmitted and received between the electronic device 100 and the server 104. The active period processing module 61 processes various functions of the electronic device 100 during the active period while a communication channel of the electronic device 100 is operated. For example, the active period processing module 61 controls the communication interface 160 to establish a communication channel with an external electronic device 102 or the server 104. Hereinafter, a description will be given of the server 104, as an example. After the communication channel with the server 104 is established, the active period processing module 61 requests the server 104 to transmit specific data according to input of a user and processes reception of the specific data.

The active period processing module 61 controls power according to a specific transmission power level in connection with receiving or transmitting data. For example, the active period processing module 61 adjusts (e.g., increases or decreases) a transmission power level corresponding to a state when a specific response signal is not received or a change in received signal strength, and the like. The active period processing module 61 temporarily stores data received from the server 104 in the memory 130 or outputs the received data to the display 150. The active period processing module 61 predicts a time point when the active period has ended in consideration of a length, a data rate, a bandwidth, and the like of data to be received from the server 104. Alternatively, the active period processing module 61 verifies a time point when the active period has ended corresponding to reception of the last data packet to be received from the server 104. When the active period has ended, the active period processing module 61 transmits information regarding the end of the active period to the inactive period processing module 63.

An inactive period may be a period after the active period has ended. For example, the inactive period may be a period when a control signal other than data associated with user functions is transmitted and received in real time, or intermittently. The inactive period may have, for example, time length defined in the server 104 or a time length defined in a protocol with the server 104. When the inactive period has ended, the electronic device 100 enters an idle period in its communication service. When data transmission and reception is requested before the idle period has ended, the electronic device 100 returns to the active period in the communication service.

When the information about the end of the active period is received from the active period processing module 61, the inactive period processing module 63 processes various functions of the electronic device 100 during the idle period. For example, the inactive period processing module 63 controls the communication interface 160 to transmit a specific control signal to the server 104 to maintain a channel with the server 104 during a specific time (or time defined in a protocol). Alternatively, the inactive period processing module 63 controls the communication interface 160 to transmit a response signal, in relation to a signal transmitted from the server 104, to the server 104. The inactive period processing module 63 changes or adjusts an operation power of at least a part of device elements associated with a communication service from among device elements of the electronic device 100 to a specific power. Also, the inactive period processing module 63 controls an antenna state. In this regard, the inactive period processing module 63 requests the performance control module 70 to control performance regarding transitioning to the inactive period.

When a request to transmit new data or a request to receive data is received within a specific time, the inactive period processing module 63 transmits a corresponding message to the active period processing module 61. The inactive period processing module 63 requests the performance control module 70 to return to a specified operation power in connection with entrance to the active period. The inactive period processing module 63 requests the performance control module 70 to adjust performance of the electronic device 100 after a specific time elapses in the inactive period in consideration of adjusting a system load, or repeatedly switching between periods, e.g., the active period, the inactive period, and the idle period. If the time defined in the protocol (or the server 104) elapses in connection with the inactive period, the inactive period processing module 63 transmits information about the lapse of the corresponding time to the idle period processing module 65.

An idle period may be a period the electronic device 100 enters corresponding to the end of the inactive period or may be a period which is in a state where the electronic device 100 completes camping in a base station device. The idle period may be a period when data is not transmitted and/or received. The idle period processing module 65 controls operation of the electronic device 100 while the electronic device 100 is within the idle period during its communication service. For example, the idle period processing module 65 minimizes power supplied to the communication interface 160 and controls data transfer by a periodic scheduling event. The idle period processing module 65 processes a change to the active period according to user input (a request to activate a web browser or a request to activate a call connection function).

The operation power control module 71 processes a necessary operation power according to a request of the state processing module 60. The operation power control module 71 adjusts a transmission power level associated with transmitting and receiving data in the active period. For example, if a communication environment during data transmission is changed, the operation power control module 71 changes a transmission power level corresponding to the change in the communication environment. For example, as a communication environment is changed to a good state of a specific condition (e.g., a state value of each of specific communication elements is greater than or equal to a certain reference value), the operation power control module 71 decreases a transmission power level. As a communication environment is changed to a bad state of less than the specific condition (e.g., the state value of each of the specific communication elements is less than the certain reference value), the operation power control module 71 increases a transmission power level.

The operation power control module 71 controls an operation power in the inactive period in response to a request of the inactive period processing module 63. For example, if a communication state is in the inactive period, the operation power control module 71 processes supply of an operation power, which is preset in connection with the inactive period, to the processor 120 (e.g., at least one of a CP or an AP).

In a communication service of the electronic device 100, a request to be changed to the active period, within a certain time after entrance to the inactive period, may be repeatedly generated within a certain time by the certain number of times or more. In this regard, the operation power control module 71 minimizes damage corresponding to a change difference in power supplied to the electronic device 100 by reducing a change difference in an operation power as the request is repeatedly generated. For example, the operation power control module 71 controls a level of an operation power to have a first operation power state during a first period after entrance to the inactive period and to have a second operation power state during a second period after entrance to the inactive period.

When the inactive period is changed to the active period, the operation power control module 71 processes supply of power necessary for operating the electronic device 100 in the active period. When the inactive period is changed to the idle period, the operation power control module 71 processes supply of power necessary for operating the electronic device 100 in the idle period.

The operation clock control module 73 sets a clock of the processor 120 in the active period differently from when the processor 120 is in the inactive period. For example, the operation clock control module 73 controls the processor 120 to operate according to a clock at a first level (e.g., a clock at a first speed) in the active period. The operation clock control module 73 controls the processor 120 to operate according to a clock at a second level (e.g., a clock at a level which is lower than the first level, or a clock at a second speed which is slower than the first speed) in the inactive period.

The antenna control module 75 supplies power to the diversity module 161 when a communication state is in the active period and controls performance of an antenna. The antenna control module 75 may turn off the diversity module 161 selectively (or intermittently) or during a corresponding period to limit performance of the antenna when a communication state is in the inactive period. The antenna control module 75 controls a turn off state of the diversity module 161 in the idle period.

The performance control module 70 controls at least one of an operation power, an operation clock, or an antenna to support a communication service of the electronic device 100. For example, the performance control module 70 controls at least one of supply of an operation power in the inactive period when the electronic device 100 enters the inactive period, a change in an operation clock, or a turn-off state of the diversity module 161 corresponding to a setting or a communication environment.

The performance control module 70 supplies a specific inactive period voltage to the CP (or the AP) after the electronic device 100 enters the inactive period or controls at least one of a change in an operation clock in the inactive period or a turn-off state of the diversity module 161, corresponding to a setting of the electronic device 100. Accordingly, the performance control module 70 may control the CP (or the AP or a modem, and the like) to operate by a specific voltage and a specific clock.

The performance control module 70 supplies at least one of a specific inactive period voltage or a specific inactive period clock to the CP (or the AP) after the electronic device 100 enters the inactive period, or turns off the diversity module 161 within a specific time (e.g., before the inactive period has ended), corresponding to a setting of the electronic device 100. Alternatively, the performance control module 70 supplies at least one of a specific first inactive period voltage or a specific first inactive period clock to the CP (or the AP) during a first period (e.g., before the inactive period has ended) when the electronic device 100 enters the inactive period or maintains the diversity module 161 at a turn-on state, corresponding to a setting of the electronic device 100.

If a first period elapses, the performance control module 70 turns off the diversity module 161 while supplying a second inactive period voltage (e.g., voltage which is lower than a first inactive period voltage and is higher than an idle period voltage) or a second inactive period clock (e.g., a clock rate which is lower than a rate of a first inactive period clock and is higher than a rate of an idle period clock) to the CP in a second period (e.g., when an inactive period has ended after the first period). The performance control module 70 adjusts a state of the diversity module 161 to a turn-off state in the first period and the second period. Alternatively, the performance control module 70 may adjust a state of the diversity module 161 to the turn-off state in the first period and adjusts a state of the diversity module 161 to a turn-on state in the second period. After the second period has ended, the performance control module 70 adjusts a state of the diversity module 161 to the turn-off state.

The performance control module 70 performs operation power control, operation clock control, or antenna control based on a communication environment. For example, when a communication environment in an active period is in a good state (e.g., when the communication environment is good), the performance control module 70 controls at least one of supply of an operation voltage or an operation clock of a first level or a turn-off operation of the diversity module 161. When the communication environment in the active period is in a bad state (e.g., when the communication environment is bad), the performance control module 70 controls at least one of supply of an operation voltage or an operation clock of a second level (e.g., a level which is higher than the first level) or the turn-off operation of the diversity module 161.

The communication control module 170 controls a communication state, for example, may reduce current used by the electronic device 100, which is consumed in the inactive period.

As described above, according to various embodiments of the present disclosure, the electronic device may include the communication control module which controls at least one of a change in a specified operation power, a change in a specified operation clock, or an operation state of the diversity module when the electronic device enters an inactive period after an active period associated with transmitting data is ended and the processor which operates in response to at least one of the specified operation power or the specified operation clock.

The communication control module 170 may be set to supply a minimum power in which the processor 120 operates in connection with maintaining a channel after the electronic device 100 enters the inactive period. Alternatively, the communication control module 170 may control supply of an inactive period current which is lower than an inactive current (e.g., 120 mA) which is set as a default, to the processor 120. The inactive period current may be, for example, a constant (or minimum) current value (e.g., 90 mA) associated with transmitting a control signal in a channel maintenance period determined by device elements of the electronic device 100.

The communication control module 170 may control supply of an operation power of a first level to the processor 120 during a first time (e.g., a certain time in the inactive period) after the electronic device 100 enters the inactive period, and may control supply of an operation power of a second level to the processor 120 during a second time (e.g., time before the electronic device 100 enters an idle period after the first time elapses) after the first time elapses.

The communication control module 170 may set at least one of the operation power, the operation clock, or the operation state of the diversity module 161 in the inactive period differently from one another, or may set at least one of a change order, a change time point, or a change level of the operation power, the operation clock, or the operation state of the diversity module 161 in the inactive period differently from one another. The communication control module 170 may set at least one of the operation power, the operation clock, or the operation state of the diversity module in the inactive period differently from one another, according to a communication environment including at least one of received signal strength, a transmission speed, or a bandwidth in the active period.

When a state value of the communication environment including at least one of the received signal strength, the transmission speed, or the bandwidth in the active period is greater than or equal to specific or predetermined value, the communication control module controls the processor 120 to operate by at least one of a first operation power or a first operation clock. Additionally or alternatively, in an operation to which the first operation power or the first operation clock is applied, the communication control module 170 adjusts a state of the diversity module 161 to a turn-off state.

When the state value of the communication environment including at least one of the received signal strength, the transmission speed, or the bandwidth in the active period is less than a specific or predetermined value, the communication control module 170 controls the processor 120 to operate by at least one of a second operation power (e.g., power which is higher than the first operation power) or a second operation clock (e.g., a clock which is higher than the first operation clock). Additionally or alternatively, in an operation to which the second operation power or the second operation clock is applied, the communication control module 170 adjusts a state of the diversity module 161 to a turn-on state.

The communication control module 170 may determine whether to apply at least one of the operation power, the operation clock, or the operation state of the diversity module 161 in the inactive period based on different parameters. The communication control module 170 may determine whether to apply at least one of the operation power, the operation clock, or the operation state of the diversity module 161 in the inactive period based on the communication environment including at least one of the received signal strength, the transmission speed, or the bandwidth in the active period.

The communication control module 170 may determine whether to apply a change in each of the operation power, the operation clock, and the operation state of the diversity module, or a change order, a change time point, or a change level of the operation power, the operation clock, and the operation state of the diversity module 161 based on a certain period.

According to various embodiments of the present disclosure, the electronic device may include a memory which stores at least one of an instruction for controlling a change in at least one operation power to be applied to an active period associated with transmitting data or an inactive period, an instruction for controlling a change in at least one operation clock, or an instruction for controlling an operation state of the diversity module and at least one processor connected with the memory. The instruction executed by the at least one processor may be set to operate the processor in response to at least one of a specified operation power or a specified operation clock corresponding to a communication state.

Figure 3:
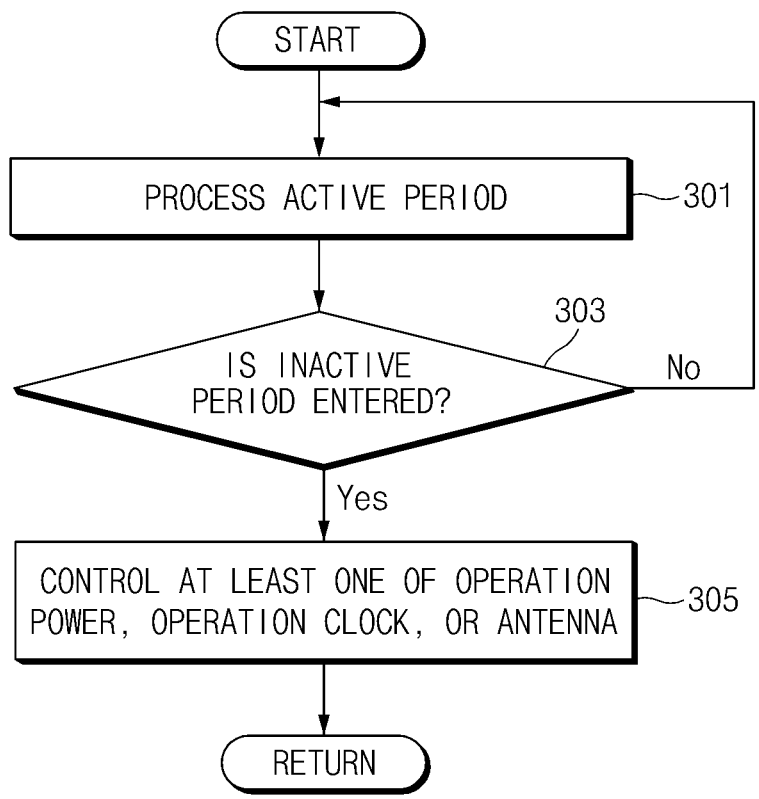
FIG. 3 is a flowchart illustrating a method of controlling a communication state, according to an embodiment of the present disclosure.

FIG. 3 is a flowchart illustrating a method of controlling a communication state, according to an embodiment of the present disclosure.

Referring to FIG. 3, in step 301, a communication control module 170 processes one or more operations of the electronic device 100 during an active period. For example, the communication control module 170 establishes a communication channel with the server 104 according to input of a user and receives data from the server 104.

In step 303, the communication control module 170 determines whether the electronic device 100 enters an inactive period. The communication control module 170 determines entrance to the inactive period by receiving a last packet of a specific file. Alternatively, when data is not transmitted and received during a specific time or when a specific control signal (e.g., a signal for guiding completion of data transmission) is received, the communication control module 170 determines entrance to the inactive period. When the electronic device 100 does not enter the inactive period, the communication control module 170 returns to step 301.

When the active period has ended and a communication state of the electronic device 100 is in the inactive period, in step 305, the communication control module 170 controls at least one of an operation power, an operation clock, or an antenna. Accordingly, the communication control module 170 y performs a control operation such that a power value of the communication state is reduced to a specific power consumption value. For example, the communication control module 170 limits a level of power supplied to the CP (or modem) associated with a communication service to a specific level, or limits a level of an operation clock of the CP to a specific level. Alternatively, the communication control module 170 controls the diversity module 161 to enter a turn-off state during the inactive period.

Figure 4:
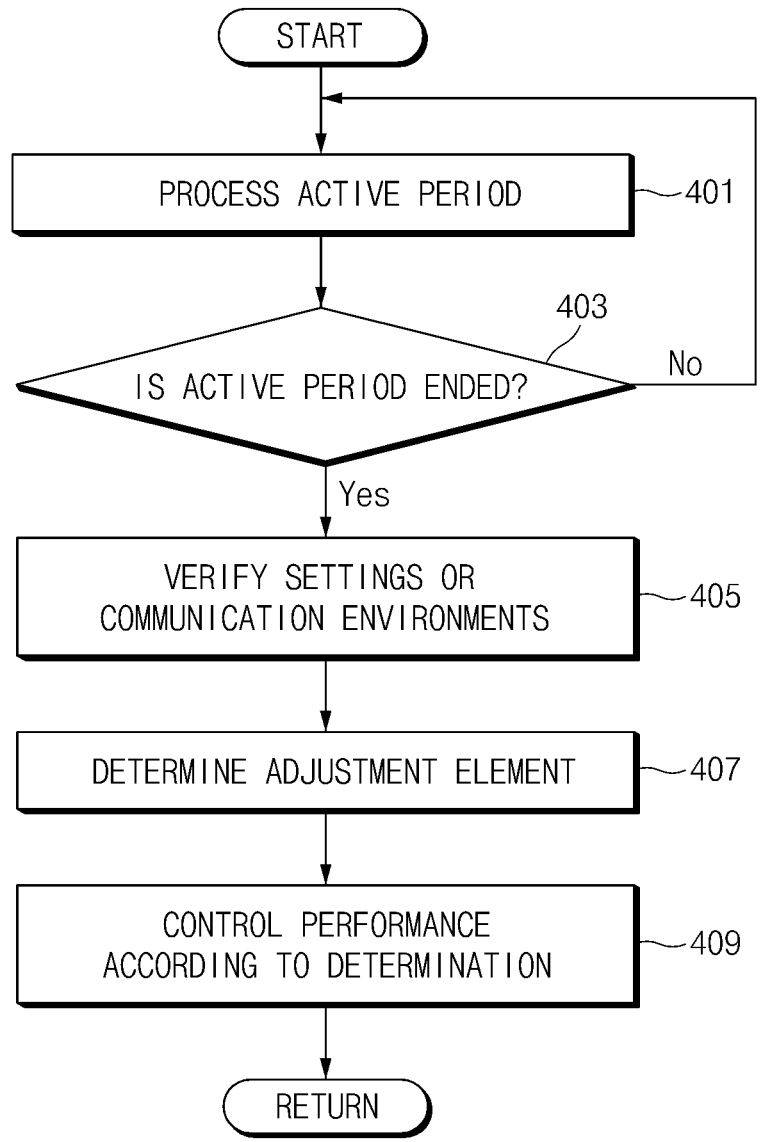
FIG. 4 is a flowchart illustrating a method of controlling a communication state, according to an embodiment of the present disclosure.

FIG. 4 is a flowchart illustrating a method of controlling a communication state, according to an embodiment of the present disclosure.

Referring to FIG. 4, in step 401, the communication control module 170 processes one or more operations of the electronic device 100 during an active period. In step 403, the communication control module 170 determines whether the electronic device 100 enters an inactive period after the active period has ended. If it is determined that the electronic device 100 has not entered the inactive period, the communication control module 170 continues to process the one or more operations of the electronic device 100 during the active period in step 401.

When the electronic device 100 ends the active period (or when the electronic device 100 enters the inactive period), in step 405, the communication control module 170 verifies settings or a communication environment. For example, the communication control module 170 verifies whether there is a setting associated with reducing current consumption. For example, the settings may include at least one of a setting for controlling an operation power, a setting for controlling an operation clock, and a setting for controlling a turn-on/turn-off state of the diversity module 161.

Alternatively, the communication control module 170 verifies a communication environment during the active period. For example, the communication control module 170 verifies a communication environment of the active period immediately before the electronic device 100 enters the inactive period. Alternatively, the communication control module 170 verifies an average communication environment of the active period. The communication control module 170 obtains information (e.g., at least one of received signal strength, a transmission speed, or a bandwidth) about a communication environment during the active period or immediately before the electronic device 100 ends the active period.

In step 407, the communication control module 170 determines an adjustment element in response to the verified information. For example, the communication control module 170 determines at least one of a level of an operation power of a processor 120, a level of an operation clock of the processor 120, and a turn-on/turn-off state of the diversity module 161.

In step 409, the communication control module 170 controls performance of the electronic device 100 corresponding to the determination. For example, the communication control module 170 changes a level of the operation power of the processor 120, in stages, during the inactive period corresponding to the setting or the communication environment. Alternatively, the communication control module 170 changes a level of the operation power of the processor 120 to a specific level during the inactive period and changes a level of the operation clock of the processor 120, in stages. Alternatively, the communication control module 170 changes a state of the diversity module 161 to a turn-off state. Alternatively, the communication control module 170 adjusts a level of a turn-on state period of the diversity module 161 and a level of a turn-off state period of the diversity module 161 based on the level of the operation power or the level of the operation clock.

After controlling the performance of the electronic device 100, the communication control module 170 controls a change in a communication state corresponding to a situation in a return operation. For example, if data transmission and reception is requested, the communication control module 170 may return to step 401. Alternatively, if a predetermined time elapses, the communication control module 170 changes to an idle state.

Figure 5:
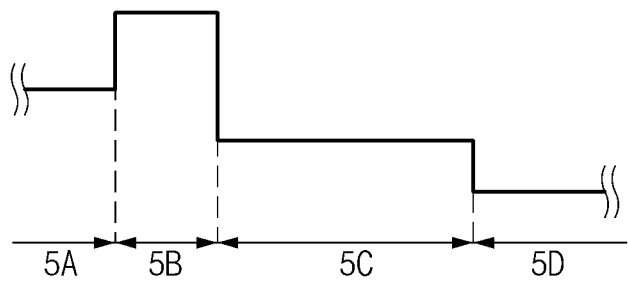
FIG. 5 is a diagram of a waveform chart illustrating states associated with controlling a communication state, according to an embodiment of the present disclosure.

FIG. 5 is a diagram of a waveform chart illustrating states associated with controlling a communication state, according to an embodiment of the present disclosure.

Referring to FIG. 5, the electronic device 100 may be in an inactive period 5A, an active period 5B, an inactive period 5C, and an idle period 5D in connection with operating a communication service.

The inactive period 5A may be an inactive period immediately before data is transmitted after a communication channel is established. Alternatively, the inactive period 5A may be an initial inactive period, and may be a period in which the processor 120 operates by an operation power of a first level, which is set as a default or by an operation clock of the first level. In the inactive period 5A, the diversity module 161 may be in a turn-on state. Alternatively, the diversity module 161 may be in a turn-off state in the inactive period 5A corresponding to a setting.

The active period 5B may be a period in which the processor 120 operates by an operation power or an operation clock of a second level (e.g., a level that is higher than the first level) corresponding to a data transmission and reception request in the inactive period 5A. In the active period 5B, the diversity module 161 may be in a turn-on state.

The inactive period 5C may be a period that the electronic device 100 enters after the active period 5B has ended. In the inactive period 5C, the processor 120 operates by an operation power or an operation clock of a third level (e.g., a level which is lower than the first level). For example, when a consumption current corresponding to the operation power of the first level is 120 mA, a consumption current corresponding to the operation power of the third level may be 90 mA. When the operation clock of the first level is 800 MHz, the operation clock of the second level may be 600 MHz. The inactive period 5C may have a certain time defined by a server 104 or a certain protocol. When a data transmission and reception request is generated in the inactive period 5C, the processor 120 performs the same operation as that of the active period 5B.

The idle period 5D may be a period in which the electronic device 100 enters when the inactive period 5C has ended. The idle period 5D may be a state where the communication interface 160 enters a sleep state after a communication service has ended.

Figure 6:
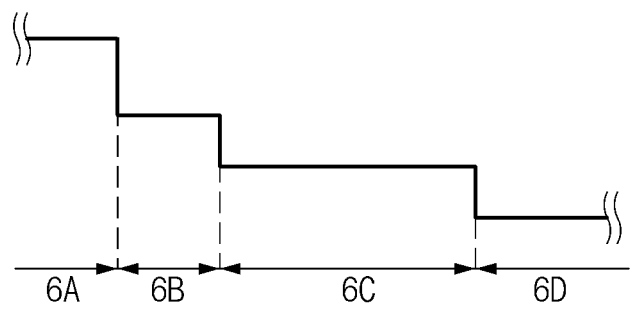
FIG. 6 is a diagram of a waveform chart illustrating states associated with controlling a communication state, according to an embodiment of the present disclosure.

FIG. 6 is a diagram of a waveform chart illustrating states associated with controlling a communication state, according to an embodiment of the present disclosure.

Referring to FIG. 6, the electronic device 100 may be in an active period 6A, an inactive period 6B, an inactive period 6C, and an idle period 6D.

The active period 6A may be a period in which the electronic device 100 transmits and receives data with an external electronic device. In the active period 6A, the AP of the electronic device 100 controls reception and processing of data associated with operating an application. Alternatively, in the active period 6A, the AP of the electronic device 100 controls data upload and the like. The electronic device 100 verifies the end of the active period 6A corresponding to at least one of verification of the last packet of transmitted or received data, reception of a specific packet, or monitoring of a communication state and the like.

The inactive period 6B may be a period in which the electronic device 100 enters when the active period 6A has end. For example, the inactive period 6B may be a period corresponding to a predetermined certain time immediately after the active period 6A has ended. In the inactive period 6B, the processor 120 operates by an operation power of a level which is lower than a level of an operation power in the active period 6A. Alternatively, in the inactive period 6B, the processor 120 operates by an operation clock of a level which is lower than a level of an operation clock in the active period 6A. Alternatively, in the inactive period 6B, the processor 120 operates by an operation power and an operation clock of a level which is lower than the level of the operation power and the operation clock in the active period 6A.

The inactive period 6C may be a period in which the electronic device 100 enters when the inactive period 6B has completed. In the inactive period 6C, the processor 120 operates by an operation power of a level which is lower than a level of an operation power in the inactive period 6B. Alternatively, the inactive period 6C, the processor 120 operates by an operation clock of a level which is lower than a level of an operation clock in the inactive period 6B. Alternatively, the inactive period 6C, the processor 120 operates by an operation power and an operation clock of a level which is lower than the level of the operation power and the operation clock in the inactive period 6B. When a data transmission and reception request (or, a request for entrance to an active period) is generated in the inactive period 6C, the processor 120 operates corresponding to a setting in the active period 6A. Alternatively, the processor 120 operates during a specific time corresponding to a setting of the inactive period 6B and operates corresponding to a setting of the active period 6A.

The idle period 6D may be a period in which the electronic device 100 enters when the inactive period 6C has ended. If the inactive period 6C has ended, the processor 120 operates corresponding to power or a clock in a specific inactive period. The diversity module 161 may be in a turn-off state.

As described above, according to various embodiments of the present disclosure, the method of controlling the electronic device corresponding to a communication state may include determining whether the electronic device enters an inactive period after an active period associated with transmitting data is ended and when the electronic device enters the inactive period, controlling at least one of a change in a specified operation power of the processor, a change in a specified operation clock of the processor, or an operation state of the diversity module.

According to various embodiments of the present disclosure, the controlling of the at least one may include supplying a minimum power by which the processor operates in connection with maintaining a channel after the electronic device enters the inactive period.

According to various embodiments of the present disclosure, the controlling of the at least one may include supplying an operation power of a first level to the processor during a first time after the electronic device enters the inactive period and supplying an operation power of a second level to the processor during a second time after the first time elapses.

According to various embodiments of the present disclosure, the controlling of the at least one may include differently setting at least one of a change order, a change time point, or a change level of the operation power, the operation clock, or the operation state of the diversity module in the inactive period corresponding to a communication environment including at least one of received signal strength, a transmission speed, or a bandwidth in the active period.

According to various embodiments of the present disclosure, the controlling of the at least one may include verifying a state value of a communication environment including at least one of received signal strength, a transmission speed, or a bandwidth in the active period and when the state value is greater than or equal to a specific value, controlling the processor to operate by at least one of a first operation power or a first operation clock.

According to various embodiments of the present disclosure, the controlling of the at least one may further include adjusting a state of the diversity module to a turn-off state.

According to various embodiments of the present disclosure, the controlling of the at least one may include verifying a state value of the communication environment including at least one of the received signal strength, the transmission speed, or the bandwidth in the active period and when the state value is less than the specific value, controlling the processor to operate by at least one of a second operation power or a second operation clock.

According to various embodiments of the present disclosure, the controlling of the at least one may further include adjusting a state of the diversity module to a turn-on state.

According to various embodiments of the present disclosure, the controlling of the at least one may include differently setting whether to apply at least one of the operation power, the operation clock, or the operation state of the diversity module in the inactive period corresponding to the communication environment including at least one of the received signal strength, the transmission speed, or the bandwidth in the active period.

According to various embodiments of the present disclosure, the controlling of the at least one may include differently setting at least one of whether to apply a change in each of the operation power, the operation clock, and the operation state of the diversity module, or a change order, a change time point, or a change level of the operation power, the operation clock, and the operation state of the diversity module corresponding to a certain period.

Figure 7:
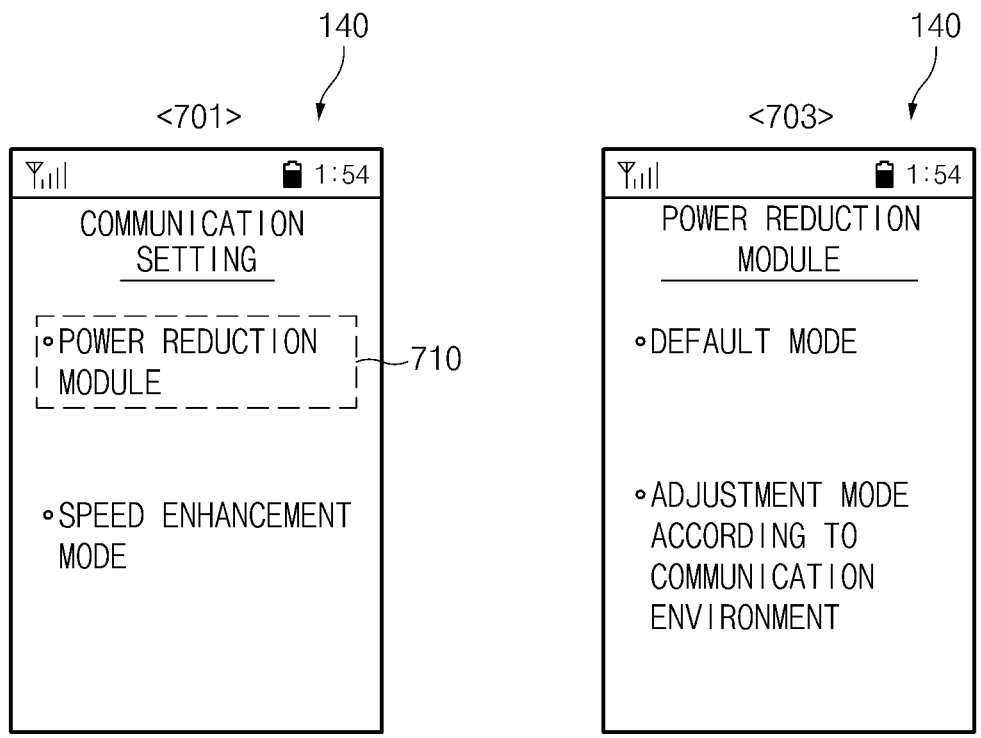
FIG. 7 is a diagram illustrating screens associated with setting a communication state, according to an embodiment of the present disclosure.

FIG. 7 is a diagram illustrating screens associated with setting a communication state, according to an embodiment of the present disclosure.

Referring to FIG. 7, the electronic device 100 outputs a communication setting screen, such as a state screen 701, on the display 150. For example, the electronic device 100 provides an icon or a menu, and the like associated with a communication setting function. When a corresponding icon or menu is selected, the electronic device 100 outputs a screen such as the state screen 701. The state screen 701 may be the communication setting screen including, for example, a power reduction item 710, which represents a power reduction mode, or a speed enhancement item, which represents a speed enhancement mode. The power reduction item 710 may be an item associated with a function for reducing current consumption in an inactive period. The speed enhancement item may be set to operate the processor 120 corresponding to power and a clock associated with transmitting a control signal during an inactive period of a communication state. Alternatively, the speed enhancement item may be set to operate the processor 120 by a minimum power or clock required to maintain a communication channel.

The electronic device 100 outputs a power reduction mode setting screen, such as a state screen 703, on the display 150 in response to selection of the power reduction item 710 on the communication setting screen. The power reduction mode setting screen may include a default item, which represents a default mode, or an adjustment item, which represents an adjustment mode, corresponding to a communication environment. The default item may be set to supply a specific inactive period voltage or clock during the inactive period corresponding to a design method. The adjustment item corresponding to the communication environment may be an item for determining an item adjusted corresponding to a communication environment in an active period. For example, the electronic device 100 determine whether to apply at least one of operation power control, operation clock control, or turn-off control of the diversity module 161 corresponding to the communication environment in the active period.

The adjustment item corresponding to the communication environment may be an item associated with a stepwise adjustment setting corresponding to the communication environment. For example, when a corresponding item is selected, the electronic device 100 adjusts an order of the operation power control, the operation clock control, and the turn-off control of the diversity module 161 at intervals of a certain time. When entering an inactive period, the electronic device 100 supplies a first operation power of a level, which is lower than a level in the active period, to the processor 120. After a first time elapses, the electronic device 100 adjusts a clock of the processor 120 to a first operation clock of a level, which is lower than a clock level in the active period. After a second time (e.g., a certain time after the first time elapses) elapses, the electronic device 100 turns off the diversity module 161. After a third time elapses, the electronic device 100 performs control according to an idle time. The electronic device 100 changes an adjustment order of the operation power, the operation clock, and the turn-off state of the diversity module 161 corresponding to a change in consumption current by corresponding elements or corresponding to a communication environment.

The electronic device 100 outputs a screen associated with a corresponding setting on the display 150 and changes the number of application elements, an order of them, levels of them, and the like corresponding to a change in user settings. For example, the power reduction mode setting screen may include an item for adjusting at least one of an operation power, an operation clock, or a power supply state of the diversity module 161.

Figure 8:
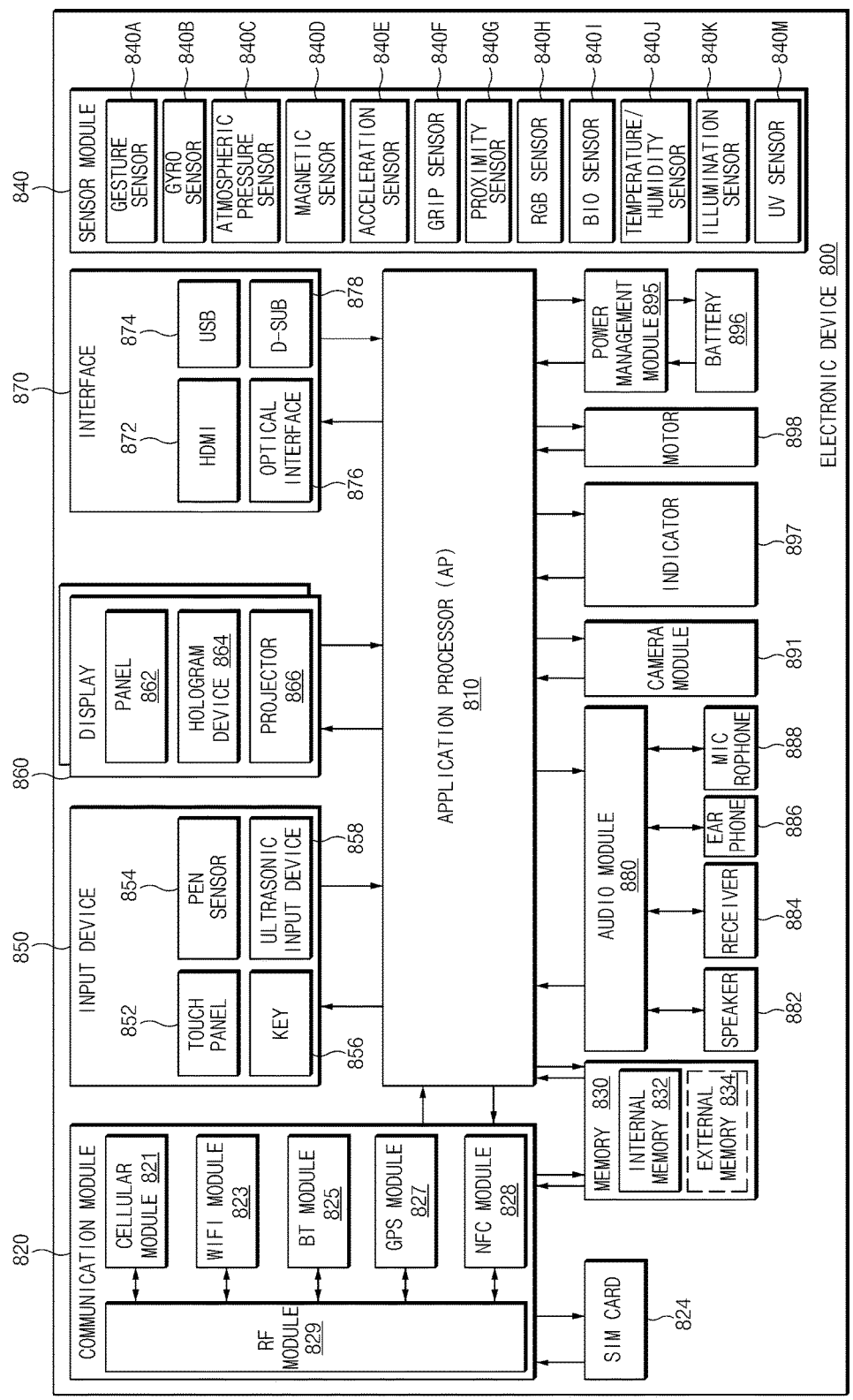
FIG. 8 is a diagram illustrating an electronic device associated with reducing current consumption, according to an embodiment of the present disclosure.

FIG. 8 is a diagram illustrating an electronic device 800 associated with reducing current consumption, according to an embodiment of the present disclosure.

Referring to FIG. 8, the electronic device 800 includes all or a part of the electronic device 100. The electronic device 800 includes one or more application processors (APs) 810, a communication module 820, a subscriber identification module (SIM) card 824, a memory 830, a sensor module 840, an input device 850, a display module 860, an interface 870, an audio module 880, a camera module 891, a power management module 895, a battery 896, an indicator 897, and a motor 898.

The AP 810 runs, for example, an operating system (OS) or an application program to control a plurality of hardware or software components connected thereto and processes and computes a variety of data. The AP 810 may be implemented with, for example, a system on chip (SoC). The AP 810 may further include a graphic processing unit (GPU) and/or an image signal processor. The AP 810 may include at least a part (e.g., a cellular module 821) of the components shown in FIG. 8. The AP 810 loads instructions or data received from at least one of other components (e.g., non-volatile memories) into a volatile memory to process the instructions or the data, and may store various data in a non-volatile memory.

The communication module 820 may have the same or similar configuration as or to that of the communication interface 160. The communication module 820 includes, for example, a cellular module 821, a Wi-Fi module 823, a BT module 825, a GPS module 827, an NFC module 828, and a radio frequency (RF) module 829.

The cellular module 821 provides, for example, a voice call service, a video call service, a text message service, or an Internet service, and the like through a communication network. The cellular module 821 identifies and authenticates the electronic device 800 within a communication network using a subscriber identification module (e.g., the SIM card 824). The cellular module 821 performs at least a part of functions which may be provided by the AP 810. The cellular module 821 may include a communication processor (CP).

The Wi-Fi module 823, the BT module 825, the GPS module 827, and/or the NFC module 828 may include, for example, a processor for processing data transmitted and received through the corresponding module. At least a part (e.g., two or more) of the cellular module 821, the Wi-Fi module 823, the BT module 825, the GPS module 827, or the NFC module 828 may be included in one integrated chip (IC) or an IC package.

The RF module 829 transmits and receives, for example, a communication signal (e.g., an RF signal). Though not shown, the RF module 829 may include, for example, a transceiver, a power amplifier module (PAM), a frequency filter, a low noise amplifier (LNA), or an antenna, and the like. At least one of the cellular module 821, the Wi-Fi module 823, the BT module 825, the GPS module 827, or the NFC module 828 transmits and receives an RF signal through a separate RF module.

The SIM card 824 may be, for example, a card which includes a SIM and/or an embedded SIM. The SIM card 824 may include unique identification information (e.g., an integrated circuit card identifier (ICCID)) or subscriber information (e.g., an international mobile subscriber identity (IMSI)).

The memory 830 (e.g., a memory 130 of FIG. 1) includes, for example, an embedded memory 832 and/or an external memory 834. The embedded memory 1032 may include at least one of, for example, a volatile memory (e.g., a dynamic random access memory (DRAM), a static RAM (SRAM), or a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash or a NOR flash, and the like), a hard drive, or a solid state drive (SSD)).

The external memory 834 may further include a flash drive, for example, a compact flash (CF), a secure digital (SD), a micro-SD, a mini-SD, an extreme digital (xD), or a memory stick, and the like. The external memory 834 may be functionally and/or physically connected with the electronic device 800 through various interfaces.

The sensor module 840 measures, for example, a physical quantity and/or detects an operation state of the electronic device 800, and converts the measured or detected information to an electric signal. The sensor module 840 may include at least one of, for example, a gesture sensor 840A, a gyro sensor 840B, an atmospheric pressure sensor 840C, a magnetic sensor 840D, an acceleration sensor 840E, a grip sensor 840F, a proximity sensor 840G, a color sensor 840H (e.g., red, green, blue (RGB) sensor), a biosensor 840I, a temperature/humidity sensor 840J, an illumination sensor 840K, or an ultraviolet (UV) sensor 840M. Additionally or alternatively, the sensor module 840 may further include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 840 may further include a control circuit for controlling at least one or more sensors included therein. The electronic device 800 may further include a processor configured as a part of the AP 810 or to be independent of the AP 810 and to control the sensor module, and may control the sensor module while the AP 810 is in a sleep state.

The input device 850 includes, for example, a touch panel 852, a (digital) pen sensor 854, a key 856, or an ultrasonic input unit 858. The touch panel 852 may use at least one of, for example, capacitive, resistive, infrared, and ultrasonic detecting methods. Also, the touch panel 852 may further include a control circuit. The touch panel 852 may further include a tactile layer, and may provide a tactile reaction to a user.

The (digital) pen sensor 854 may be, for example, a part of the touch panel 852 and may include a separate sheet for recognition. The key 856 may include, for example, a physical button, an optical key, or a keypad. The ultrasonic input unit 858 may be a device, which allows the electronic device 800 to detect a sound wave using a microphone (e.g., a microphone 888) and to determine data through an input tool generating an ultrasonic signal.

The display module 860 (e.g., the display module 150) includes a panel 862, a hologram device 864, or a projector 866. The panel 862 may include the same or similar configuration as or to that of the display 150. The panel 862 may be implemented to be, for example, flexible, transparent, or wearable. The panel 862 and the touch panel 852 may be integrated into one module. The hologram device 864 may project a stereoscopic image in a space using interference of light. The projector 866 may project light onto a screen to display an image. The screen may be positioned, for example, inside or outside of the electronic device 800. The display module 860 may further include a control circuit for controlling the panel 862, the hologram device 864, or the projector 866.

The interface 870 may include, for example, a high-definition multimedia interface (HDMI) 872, a universal serial bus (USB) 874, an optical interface 876, or a D-sub-miniature 878. The interface 870 may be included in, for example, the communication interface 160. Additionally or alternatively, the interface 870 may include, for example, a mobile high definition link (MHL) interface, an SD card/ multimedia card (MMC) interface, or an infrared data association (IrDA) standard interface.

The audio module 880 converts, for example, a sound and an electric signal in dual directions. At least a part of components of the audio module 880 may be included in, for example, the input and output interface 140. The audio module 880 processes sound information input or output through, for example, a speaker 882, a receiver 884, an earphone 886, or the microphone 888, and the like.

The camera module 891 may be, for example, a device which captures a still picture and a moving picture. The camera module 891 includes one or more image sensors (e.g., a front sensor or a rear sensor), a lens, an image signal processor (ISP), or a flash (e.g., an LED or a xenon lamp).

The power management module 895 manages, for example, power of the electronic device 800. The power management module 895 may include a power management integrated circuit (PMIC), a charger IC or a battery gauge. The PMIC may perform a wired charging method and/or a wireless charging method. The wireless charging method may be, for example, a magnetic resonance method, a magnetic induction method, or an electromagnetic method, and the like. An additional circuit for wireless charging, for example, a coil loop, a resonance circuit, or a rectifier, and the like may also be provided. The battery gauge may measure, for example, the remaining capacity of the battery 896 and voltage, current, or temperature thereof while the battery 896 is charged. The battery 896 may be, for example, a rechargeable battery and/or a solar battery.

The indicator 897 displays a specific state of the electronic device 800 or a part (e.g., the AP 810) thereof, for example, a booting state, a message state, or a charging state, and the like. The motor 898 converts an electric signal into mechanical vibration, and generates vibration or a haptic effect, and the like. Though not shown, the electronic device 800 may include a processing unit (e.g., a GPU) for supporting a mobile TV. The processing unit for supporting the mobile TV may process media data according to the standard of, for example, digital multimedia broadcasting (DMB), digital video broadcasting (DVB), or media flow, and the like.

Each of the above-mentioned elements of the electronic device 800 may be configured with one or more components, and names of the corresponding elements may be changed according to the type of the electronic device. The electronic device 800 may include at least one of the above-mentioned elements, some elements may be omitted from the electronic device, or other additional elements may be further included in the electronic device 800. Also, some of the elements of the electronic device 800 may be combined with each other to form one entity, thereby making it possible to perform the functions of the corresponding elements in the same manner as before the combination.

Figure 9:
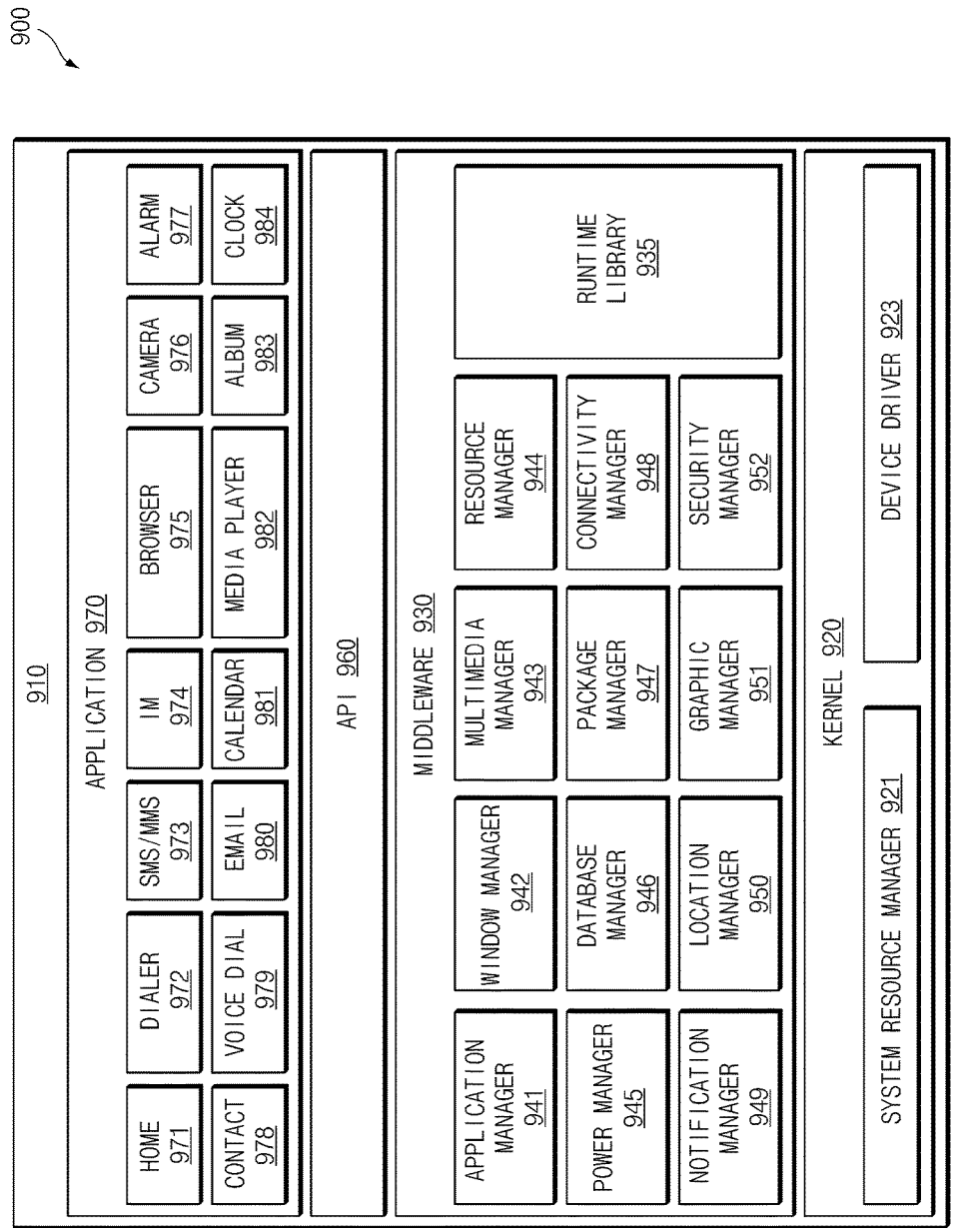
FIG. 9 is a diagram illustrating a configuration of a program module, according to an embodiment of the present disclosure.

FIG. 9 is a block diagram illustrating a configuration of a program module, according an embodiment of the present disclosure.

Referring to FIG. 9, a program module 910 may include an operating system (OS) for controlling resources associated with an electronic device (e.g., the electronic device 100) and/or various applications (e.g., the application 144) which are executed on the OS. The OS may be, for example, Android®, iOS®, Windows®, Symbian®, Tizen®, or Bada®, and the like.

The program module 910 includes an OS and an application 970. The OS includes a kernel 920, a middleware 930, and an API 960. At least a part of the program module 910 may be preloaded on the electronic device, or may be downloaded from a server (e.g., the server device 104).

The kernel 920 includes, for example, a system resource manager 921 and/or a device driver 923. The system resource manager 921 controls, assigns, and/or collects, and the like system resources. The system resource manager 921 may include a process management unit, a memory management unit, or a file system management unit, and the like. The device driver 923 may include, for example, a display driver, a camera driver, a BT driver, a shared memory driver, a USB driver, a keypad driver, a Wi-Fi driver, an audio driver, or an inter-process communication (IPC) driver.

The middleware 930 provides, for example, functions to the application 370, and provides various functions to the application 970 through the API 960 such that the application 970 efficiently uses limited system resources in the electronic device. The middleware 930 (e.g., the middleware 142) includes at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, or a security manager 952.

The runtime library 955 may include, for example, a library module used by a compiler to add a new function through a programming language while the application 970 is executed. The runtime library 955 performs a function about input and output management, memory management, or an arithmetic function.

The application manager 941 manages, for example, a life cycle of at least one of the application 970. The window manager 942 manages graphic user interface (GUI) resources used on a screen of the electronic device. The multimedia manager 943 ascertains a format necessary for reproducing various media files and encodes or decodes a media file using a codec corresponding to the corresponding format. The resource manager 944 manages source codes of at least one of the application 370 and manages resources of a memory or a storage space, and the like.

The power manager 945 may operate in conjunction with, for example, a basic input/output system (BIOS) and the like, may manage a battery or a power source, and may provide power information necessary for an operation of the electronic device. The database manager 946 generates, searches, or changes a database to be used in at least one of the application 970. The package manager 947 manages installation or update of an application distributed by a type of a package file.

The connectivity manager 948 manages, for example, wireless connection such as Wi-Fi connection or BT connection, and the like. The notification manager 949 displays or notifies events, such as an arrival message, an appointment, and proximity notification, by a method which is not disturbed to the user. The location manager 950 manages location information of the electronic device. The graphic manager 951 manages a graphic effect to be provided to the user or a user interface (UI) related to the graphic effect. The security manager 952 provides all security functions necessary for system security or user authentication, and the like. When the electronic device (e.g., the electronic device 100) has a phone function, the middleware 930 may further include a telephony manager for managing a voice or video communication function of the electronic device.

The middleware 930 may include a middleware module which configures combinations of various functions of the above-described components. The middleware 930 may be provided with a module which specializes according to kinds of OSs to provide a differentiated function. Also, the middleware 930 may delete old components or may add new components.

The API 960 (e.g., the API 143) may be, for example, a set of API programming functions, and may be provided with different components according to OSs. For example, in case of Android® or iOS®, one API set may be provided corresponding to platforms. In case of Tizen®, two or more API sets may be provided corresponding to platforms.

The application 970 (e.g., the application 144) may include one or more of, for example, a home application 971, a dialer application 972, a short message service/multimedia message service (SMS/MMS) application, an instant message (IM) application 974, a browser application 975, a camera application 976, an alarm application 977, a contact application 978, a voice dial application 979, an e-mail application 980, a calendar application 981, a media player application 982, an album application 978, a clock application 984, a health care application (e.g., an application for measuring quantity of exercise or blood sugar, and the like), an environment information application (e.g., an application for providing atmospheric pressure information, humidity information, or temperature information, and the like), and the like.

The application 970 may include an application (e.g., an information exchange application) for exchanging information between the electronic device 100 and an external electronic device 102. The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device 102. Also, the notification relay application may receive, for example, notification information from the external electronic device, and may provide the received notification information to the user of the electronic device. The device management application may manage (e.g., install, delete, or update), for example, at least one (e.g., a function of turning on/off the external electronic device itself (or partial components) or a function of adjusting brightness (or resolution) of a display) of functions of the external electronic device 102 which communicates with the electronic device, an application which operates in the external electronic device, or a service (e.g., a call service or a message service) provided from the external electronic device 102.

The application 970 may include an application (e.g., the health card application) which is preset corresponding to an attribute (e.g., an attribute of the electronic device, in other words, when the electronic device is a mobile medical device) of the external electronic device (e.g., the electronic device 102). The application 970 may include an application received from the external electronic device (e.g., the server 104 or the electronic device 102). The application 970 may include a preloaded application or a third party application which may be downloaded from a server. Names of the components of the program module 910 according to various embodiments of the present disclosure may differ corresponding to kinds of OSs.

At least a part of the program module 910 may be implemented with software, firmware, hardware, or at least two or more combinations thereof. At least a part of the program module 910 may be implemented (e.g., executed) by, for example, a processor (e.g., an AP 810). At least a part of the program module 910 may include, for example, a module, a program, a routine, sets of instructions, or a process, and the like for performing one or more functions.

At least a part of the electronic devices 100, 800 (e.g., modules or the functions) or methods (e.g., operations) described above may be implemented with, for example, instructions stored in a non-transitory computer-readable storage media which has a program module. When the instructions are executed by a processor (e.g., the processor 120), one or more processors may perform functions corresponding to the instructions. The non-transitory computer-readable storage media may be, for example, the memory 130.

The non-transitory computer-readable storage media may include a hard disc, a floppy disk, magnetic media (e.g., a magnetic tape), optical media (e.g., a compact disc read only memory (CD-ROM), a digital versatile disc (DVD), and magneto-optical media (e.g., a floptical disk)), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

The non-transitory computer-readable storage media may include instructions which may be executed by at least one processor. The instructions may be set to determine whether an electronic device, e.g., electronic devices 100, 800, enters an inactive period after an active period associated with transmitting data is ended and to control at least one of a change in a specified operation power of a processor, a change in a specified operation clock of the processor, or an operation state of a diversity module when the electronic device enters the inactive period.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

As described herein, the electronic devices 100, 800 minimize power consumption by being controlled corresponding to a communication state thereof.

The electronic devices 100, 800 reduce power consumption required for a specific communication state by adjusting states of elements associated with its communication performance.

While the present disclosure has been shown and described with reference to certain embodiments thereof, it should be understood by those skilled in the art that many variations and modifications of the method and apparatus described herein will still fall within the scope of the present disclosure as defined in the appended claims and their equivalents.

What is claimed is:

1. An electronic device, comprising:
   a plurality of antennas;
   a memory; and
   a processor electrically connected with the memory,
   wherein the processor is configured to:
   when the electronic device enters an inactive period after an active period associated with transmitting data has ended, adjust a state of a diversity module to a turn-on state when a state value of a communication environment of the electronic device including at least one of received signal strength, a transmission speed, or a bandwidth in the active period is less than a predetermined value; or
   adjust a state of the diversity module to a turn-off state when the state value of the communication environment is greater than or equal to the predetermined value.

2. The electronic device of claim 1, wherein after the electronic device enters the inactive period, the processor is supplied a minimum amount of power that is required to maintain a channel connection.

3. The electronic device of claim 1, wherein after the electronic device enters the inactive period, the processor is supplied power corresponding to a first level during a first time, and is supplied power corresponding to a second level during a second time after the first time elapses, wherein the second power is less than the first power.

4. The electronic device of claim 1, wherein the processor is further configured to:
   control at least one of a change in a specified operation power and a change in a specified operation clock rate; and
   set at least one of a change order, a change time point, a change level of an operation power or an operation clock rate in the inactive period according to the communication environment.

5. The electronic device of claim 4, wherein the processor is further configured to operate using at least one of a predetermined first operation power or a predetermined first operation clock rate when the state value of the communication environment is greater than or equal to the predetermined value.

6. The electronic device of claim 4, wherein the processor is further configured to operate using at least one of a second operation power or a second operation clock rate when the state value of the communication environment is less than the predetermined value.

7. The electronic device of claim 4, wherein the processor is further configured to determining whether to apply at least one of the operation power or the operation clock rate in the inactive period according to the communication environment.

8. The electronic device of claim 4, wherein the processor is further configured to determining whether to apply one of:
   a change in each of the operation power and the operation clock rate; and
   a change order, a change time point, or a change level of the operation power and the operation clock rate corresponding to a certain period.

9. The electronic device of claim 1, wherein the inactive period includes a period for transmitting a control signal indicating a completion of the data transmission.

10. A method of controlling an electronic device including a processor according to a wireless communication state, the method comprising:
    determining whether the electronic device enters an inactive period associated with the wireless communication after an active period associated with transmitting data based on the wireless communication has ended; and
    when the electronic device enters the inactive period associated with the wireless communication and a state value of a communication environment of the electronic device including at least one of received signal strength, a transmission speed, or a bandwidth in the active period is less than a predetermined value, adjusting a state of a diversity module to a turn-on state; or
    when the electronic device enters the inactive period associated with the wireless communication and the state value of the communication environment is greater than or equal to the predetermined value, adjusting a state of the diversity module to a turn-off state.

11. The method of claim 10, further comprising controlling at least one of a change in a specified operation power of the processor and a change in a specified operation clock rate of the processor,
    wherein the controlling comprises supplying a minimum power to the processor in order to maintain a channel after the electronic device enters the inactive period.

12. The method of claim 10, further comprising controlling at least one of a change in a specified operation power of the processor and a change in a specified operation clock rate of the processor,
    wherein the controlling comprises:
    supplying an operation power of a first level to the processor during a first time after the electronic device enters the inactive period; and
    supplying an operation power of a second level to the processor during a second time after the first time elapses.

13. The method of claim 10, further comprising controlling at least one of a change in a specified operation power of the processor and a change in a specified operation clock rate of the processor,
- wherein the controlling comprises setting at least one of a change order, a change time point, a change level of the operation power, or the operation clock rate in the inactive period according to a communication environment including at least one of received signal strength, a transmission speed, or a bandwidth in the active period.

14. The method of claim 13, wherein the controlling further comprises:
- verifying the state value of the communication environment; and
- when the state value is greater than or equal to the predetermined value, controlling the processor to operate using at least one of a first operation power or a first operation clock rate.

15. The method of claim 13, wherein the controlling further comprises:
- verifying the state value of the communication environment; and
- when the state value is less than the predetermined value, controlling the processor to operate using at least one of a second operation power or a second operation clock rate.

16. The method of claim 10, further comprising controlling at least one of a change in a specified operation power of the processor and a change in a specified operation clock rate of the processor,
- wherein the controlling comprises:
- determining whether to apply at least one of the operation power and the operation clock rate in the inactive period according to a communication environment.

17. The method of claim 10, further comprises controlling at least one of a change in a specified operation power of the processor and a change in a specified operation clock rate of the processor;
- wherein the controlling comprises determining whether to apply at least one of:
- a change in each of the operation power, the operation clock, and an operation state of the diversity module; and
- a change order, a change time point, a change level of the operation power, the operation clock, or the operation state of the diversity module corresponding to a certain period.

18. The method of claim 10, wherein the inactive period includes a period for transmitting a control signal indicating a completion of the data transmission.

* * * * *